Oct. 28, 1958     E. WILDHABER ET AL     2,857,774
TAPERED GEARS
Original Filed Jan. 23, 1952     4 Sheets-Sheet 1

*INVENTORS*
ERNEST WILDHABER
CHARLES B. KING
BY Richard W. Treverton
*ATTORNEY*

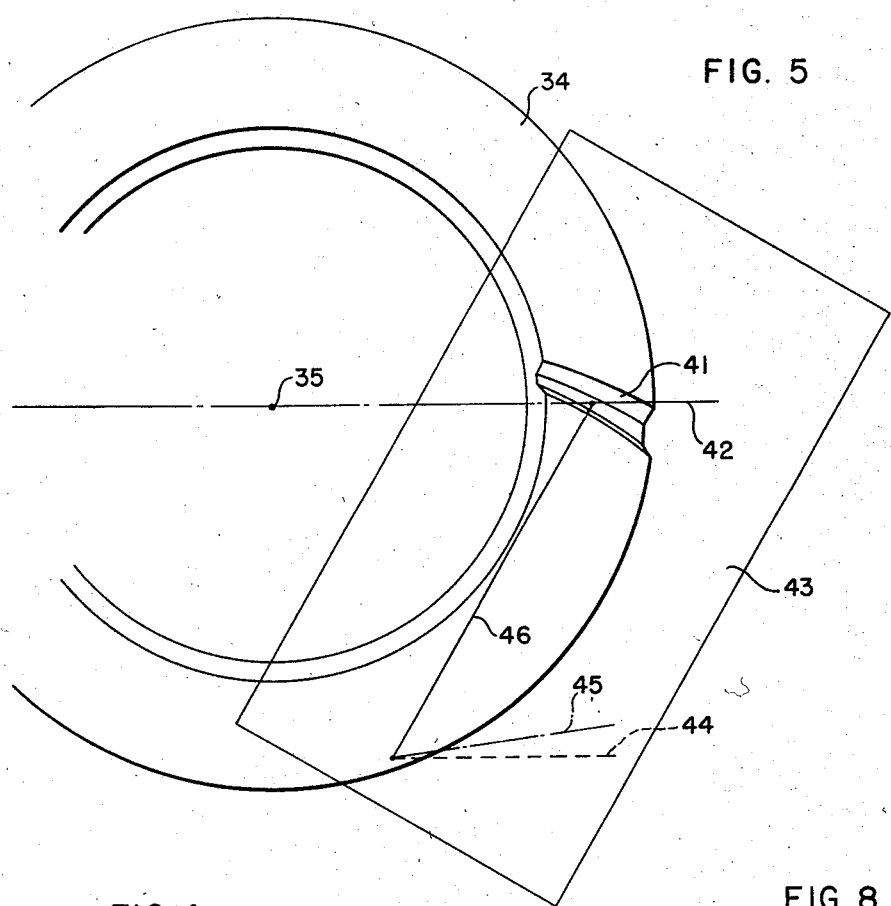
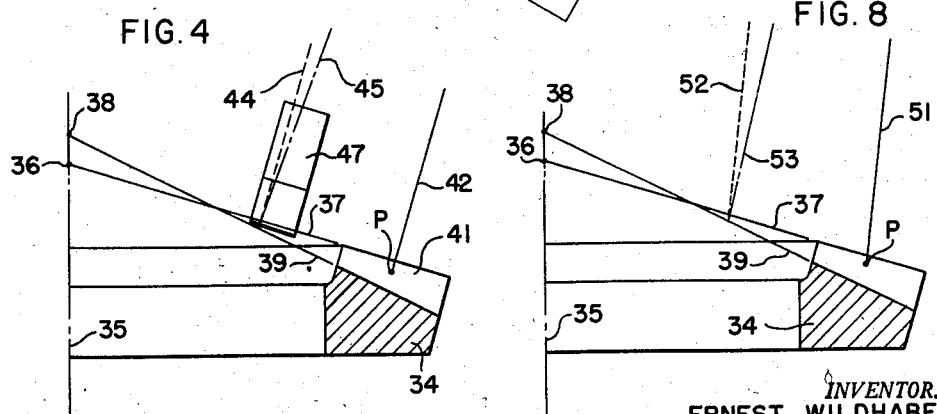

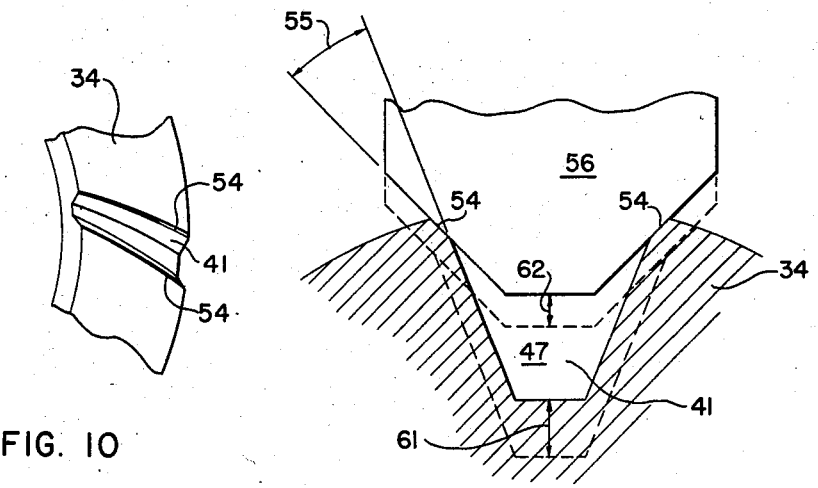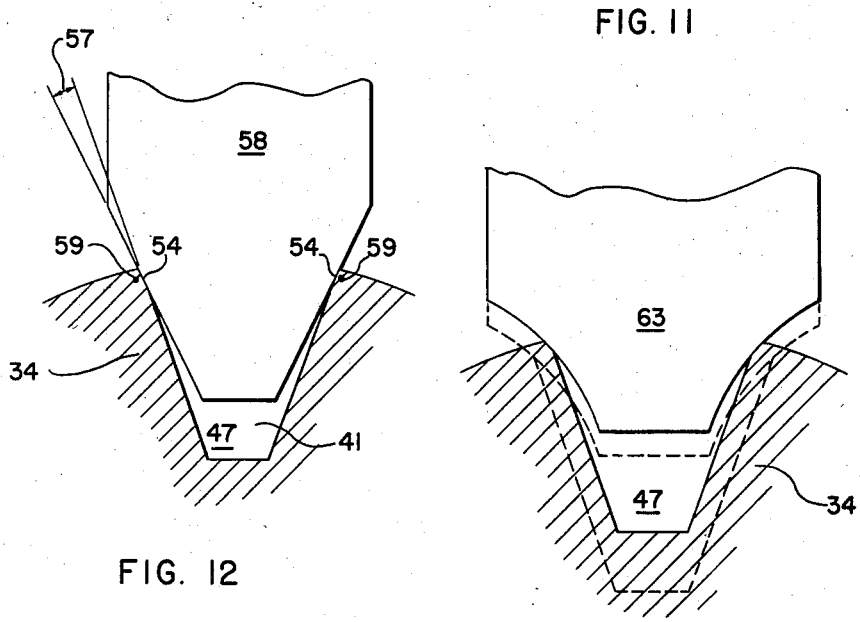

United States Patent Office 2,857,774
Patented Oct. 28, 1958

2,857,774

TAPERED GEARS

Ernest Wildhaber and Charles B. King, Brighton, N. Y., assignors to The Gleason Works, Rochester, N. Y., a corporation of New York Division of application Serial No. 267,824, January 23, 1952. This application October 4, 1956, Serial No. 616,906

10 Claims. (Cl. 74—424.5)

The present invention relates to improved tapered gears, especially spiral bevel and hypoid gears, of the type wherein one member of each pair is a non-generated gear, this invention being a division of our application Serial No. 267,824, filed January 23, 1952.

In conventional production with straight sided face mill cutters of this general kind of gear, and of the generated pinion to mate with it, the gear cutter is set to cut along the root plane of the gear, and the pinion cutter to cut to the root plane of the pinion. As a result, the pressure angles of the gear and pinion teeth do not match from end to end of the teeth, producing an objectionable bias tooth bearing, unless some remedial procedure is followed. Various procedures for this purpose have been devised heretofore, the one most commonly used being the cutting of the pinion to a different cone apex position on each side of the pinion teeth, and different from that on which it runs with its mate gear. This method is disclosed in Patent No. 1,685,442 of the present co-inventor E. Wildhaber and A. H. Candee. In cutting pinions to mate with non-generated gears it has the limitation that for pairs of low tooth number ratio, the tilt of the cutter relative to the axis of the generating motion becomes very large when cutting one side of the pinion teeth and exceeds the range of tilt adjustment provided on conventional pinion generating machines. Another limitation in producing non-generated gears for pairs of low tooth number ratio is the change in pressure angle from end to end of the teeth. This change becomes progressively greater as the root angle of the gear is made smaller and as the curvature of the root cone accordingly becomes greater.

One object of the present invention is to provide an improved form of tooth which does not require any bias correction and which has less variation in pressure angle from end to end of the tooth.

Another object of the present invention is to enable generation of the pinions, especially for lower ratio gear pairs, without increasing the required cutter tilt beyond that which is required to cut to the root plane when the pinion is mounted to the cone apex position on which it will run with its mate gear. According to the invention, the side faces of the gear teeth are formed as helicoidal surfaces, which closely approximate the conical surfaces defined by the active profiles of the rotary cutters employed in generating the pinion teeth. Accordingly the gear and pinion teeth match closely in pressure angle throughout their length, thus obviating bias tooth bearing without resort to any of the special procedures heretofore employed for this purpose in the cutting of the pinion. Moreover the curvatures of the tooth sides of the gear more closely follow its conical front face than in conventional non-generated gears, with the result that there is substantially less change in pressure angle from end to end of the teeth.

In the prior art the axis of curvature of each tooth side surface, i. e. the axis of rotation of the gear cutter, is disposed in a plane which is so positioned as to contain a line which passes through a selected mean point of the related tapered tooth space and is normal either to the root cone or to the pitch cone of the gear. In other words the plane is so positioned that it intersects a plane containing the gear axis in a line that passes through the mean point and is inclined to the plane of rotation of the gear by an angle that is substantially equal to or less than the pitch angle of the gear. According to the present invention the corresponding plane containing the cutter axis is positioned differently. It is positioned so as to intersect a plane containing the gear axis in a line which, while also passing through the mean point of the tooth space, is inclined to the plane of rotation of the gear by an angle substantially equal to or greater than the face angle of the gear.

Another object of the invention is to provide a gear having teeth with helicoidal relief along their tip edges. Such relief may be produced in the same operation as the tooth sides proper, and may be either in the form of a chamfer, to eliminate sharp edges along the tops of the teeth, or a relief formed at only a small angle from the working faces to relieve the tips from bearing loads. The latter kind of relief is generally similar in effect to that disclosed in the F. E. McMullen Patent 2,385,220, but, being applied to the tips of the gear teeth rather than to the roots of the pinion teeth, as disclosed in the patent, obviates any undercutting of the pinion teeth.

The foregoing and other objects and advantages of the invention will appear from the following description made with reference to the drawings, wherein:

Figs. 4 and 5 are respectively an axial section and a face view of a ring gear to show the relationship therewith of the gear cutter axis;

Fig. 8 is a view like Fig. 4 but showing an alternate disposition of the cutter axis;

Fig. 10 is a fragmentary face view of a gear chamfered according to the present invention;

Figs. 11, 12 and 13 are fragmentary views on an enlarged scale taken in a plane axial of the cutter, and respectively illustrating three different forms of chamfering blade.

Figures 1, 2:
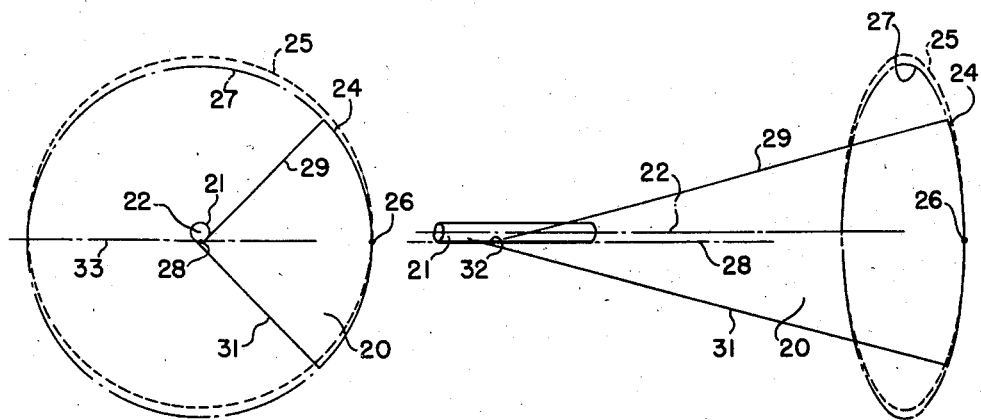
Figs. 1, 2 and 3 are respectively an end, a plan and a perspective side view of a geometrical construction illustrating the basis of one aspect of the invention.
Figure 3:
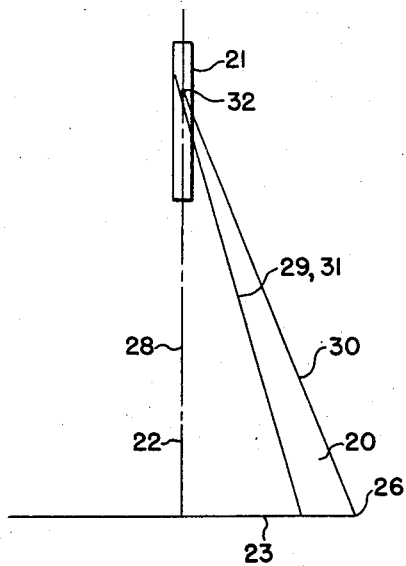

The principle on which one aspect of the invention is based is shown in Figs. 1, 2 and 3 where 20 represents an involute helicoidal surface whose base cylinder and axis are designated 21 and 22, respectively. The intersection of surface 20 with a transverse plane 23 is an involute 24. This involute departs substantially from a circle 25 lying in plane 23 and which is concentric with axis 22 and has the same radius as the polar radius of the involute at mean point 26. However for the range here concerned the involute 24 is substantially coincident with a circle 27 lying in the same plane as circle 25, and having the same radius of curvature as does the involute at point 26 and having its center on an axis 28 that is an element of cylinder 21. Moreover the elements of helicoid 20, such as 29 and 31, are straight lines and the helicoid therefore very closely approximates a cone whose base is circle 27 and whose apex is at the juncture point 32 with axis 28 of the straight line element of the helicoid 20 that contains mean point 26. This element of the helicoid, which appears as line 30 in Fig. 3, is also an element of the cone.

According to the present invention the teeth of the gear have substantially helicoidal surfaces, like surface 20, while the teeth of the generating gear of the pinion comprise conical surfaces like the surface of the cone whose axis is 28 and whose apex is 32. Accordingly the mating tooth surfaces of the gear and pinion will match as to pressure angle, exactly at a mean point along the length of the teeth and very closely at the ends of the teeth, so that bias tooth bearing is obviated. Following this principle does not preclude such slight mismatch of the mating tooth surfaces as is usually desired in order to localize the tooth bearing. For example the cone whose apex is at 32 may be shifted along its common element with helicoid 20 (the element extending through mean point 26) to produce a slight mismatch of the surfaces. Furthermore it is not necessary that the axis of the conical surface be exactly parallel to axis 22 of the helicoid in order to obtain whatever coincidence or matching of the gear and pinion generating gear tooth surfaces is desired. The cone axis may extend at a small angle to axis 22 provided that it remains in the plane 33 containing the element 28 of base cylinder 21 and the point 26, and that the element of the cone which contains point 26 is coincident with the element of the helicoid that also contains point 26.

In the range contemplated by the present invention, the intersection of an involute helicoid such as 20 with a plane containing its axis 22 is so slightly curved that for practical purposes it may be reproduced by a cutter that has a straight cutting profile in the axial plane, by moving the cutter axially in time with its rotation. For theoretical correctness the cutter profile might be slightly curved in the axial plane, either by grinding such curvature into cutting edges which extend in this plane or by offsetting straight cutting edges from this plane by a distance equal to the radius of the base cylinder 21.

Figure 6:
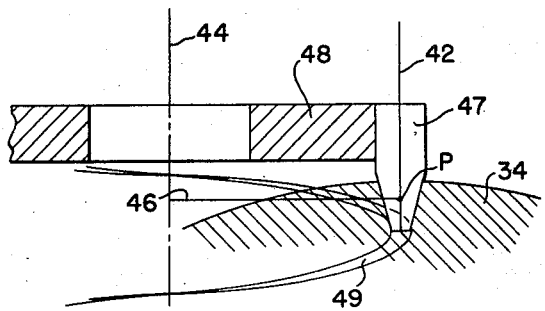
Figs. 6 and 7 are axial sections through the cutters, showing alternative relationships of the cutter axis to the gear.

In Figs. 4 and 5 is represented a non-generated tapered ring gear 34 whose axis 35 contains apex 36 of face cone 37 and apex 38 of root cone 39. P is a selected mean point of gear tooth space 41, and line 42 is the face normal inasmuch as it extends through P in a direction perpendicular to face cone 37. Plane 43 contains face normal 42 and itself is normal to the curved tooth space 41. It corresponds to plane 33 of Fig. 1. The sides of the tooth space 41 are helicoidal surfaces, either substantially or exactly involute in form, like the surface 20 of Figs. 1 to 3. Their axis and also, of course, the axis of the cutter employed to produce them, lies in the normal plane 43 and may be either a line such as 44 in this plane that is parallel to face normal 42, corresponding to axis 22 of Figs. 1 to 3, or a line such as 45 also in plane 43 but which is disposed at an angle to face normal 42 and axis 44. In case 44 is the axis of the cutter, the line 46, which extends between lines 42 to 44 and is perpendicular to them, represents the mean radius of the cutter. In Figs. 4 and 6 a blade of the cutter is represented at 47, the blade being carried by a cutter head 48 rotating on axis 44. As the cutter rotates to sweep the blade through the tooth space 41, it is moved along axis 44 in time with its rotation, so that the tip of the blade follows a helical path 49 tangent to the root cone 39.

Figure 7:
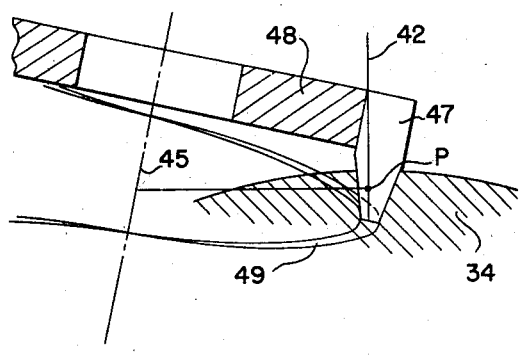

In Fig. 6 the pressure angles of the inside and outside cutting profiles of the cutter are symmetrical, and, since the cutter axis 44 is parallel to face normal 42, the pressure angles of the opposite sides of the tooth space are also equal at the mean point along the tooth length. In Fig. 7 the inside and outside cutting profiles are also of equal pressure angle, but in this case the cutter rotates on axis 45 that is inclined to the face normal 42, so that the pressure angles are different on opposite sides of the teeth at the mean point. This applies especially to hypoid gears. Unequal pressure angles can also be attained on the gear by using unequal blade angles.

The method of cutting the gear hereinbefore described enables the mating pinion to be generated on a conventional machine with a circular face mill cutter so tilted that its axis is parallel to plane 43, just as axis 28 is parallel to axis 22 in Figs. 1 and 3. Assuming that the gear and pinion are to be mounted at right angles, the pinion may be cut while set in the machine at ninety degrees to the axis of the generating motion of the cutter, i. e. to the axis of the cradle on which the cutter is mounted. This is in contrast to conventional practice where the plane which contains the axis of the gear cutter (corresponding to plane 43 in Fig. 5) is so positioned as to contain a line (corresponding to line 42) which is normal to the root cone 39 instead of to the face cone 37 as shown in Fig. 4, with the result that at least one side of the pinion teeth has to be generated with the pinion set at an angle smaller than ninety degrees to the cradle axis. This requires a correspondingly greater tilt of the cutter.

In the heat treatment of spiral bevel and hypoid gears and pinions subsequent to cutting the teeth a distortion usually occurs that is in a direction to accentuate the bias bearing condition heretofore described, or, when the present method is used, to introduce bias where none exists in the gears and pinions as cut. To obviate this difficulty the present invention contemplates cutting the gear with an additional pressure angle variation from end to end of the tooth surfaces that will compensate for the heat treat distortion of both the gear and pinion. To this end the plane containing the cutter axis (corresponding to plane 43) is so positioned as to intersect a plane containing the cutter axis and the point P in a line which is inclined to the plane of rotation of the gear at an angle larger than the face angle of the gear. This is illustrated in Fig. 8 where the cutter axis plane, i. e. the plane corresponding to plane 43 in Fig. 5, is inclined so that its line of intersection 51 with the axial plane (the plane of Fig. 8) makes a smaller angle with axis 35 than does the face normal 42 (Fig. 4). The cutter axis is disposed in this cutter axis plane either at 52, parallel to line 51 (just as axis 44 is parallel to face normal 42), or at 53, inclined to line 51 (as axis 45 is inclined to 42).

Figure 9:
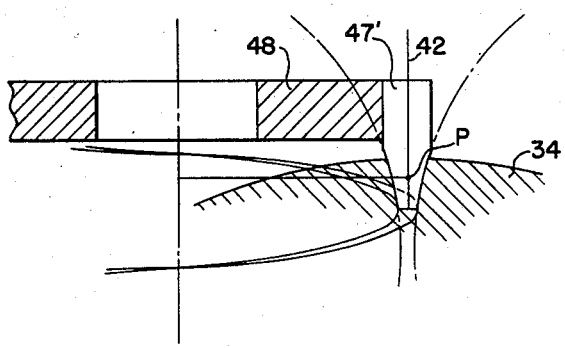
Fig. 9 is a view like Figs. 6 and 7 but showing a modified cutter blade.

In Figs. 6 and 7 the blade 47 is shown as having straight or nearly straight inside and outside cutting edges. If desired, substantially curved cutting edges (i. e. edges more curved than would be employed merely for profile mismatch) may be employed instead, and this is shown in Fig. 9 where the side cutting edges of blades 47′ of the gear cutter are concave circular arcs of relatively small radius. The side cutting edges of the cutter for a mating pinion would be circular convex arcs of the same or slightly larger radius. Such curved cutting edges are more feasible with the present invention than with prior methods, because the tooth profiles match better throughout the length of the teeth.

Fig. 10 illustrates a relief, designated 54, at the tips of the teeth of gear 34, that is cut in the same operation and with the same cutter employed in cutting of the tooth space 41 proper. The relief may take the form of a chamfer, such as shown in Fig. 11, to eliminate sharp edges and burrs. In this case the relieved surfaces may be at a substantial angle 55 to the sides of the tooth space 41, i. e. to the working faces of the gear teeth; and a chamfering blade 56 having a relatively large pressure angle is employed for this purpose. Alternatively the tip relief 54 may, as shown in Fig. 12, be at a very small angle 57 from the working tooth faces, say an angle on the order of five degrees. In this case the cutting edges of the tip relieving blade 58 have a pressure angle only slightly greater than the cutting blade 47. The effect of such tip relief is to eliminate or at least greatly reduce tooth bearing loads from the top edge portions 59 of the gear teeth. In either case the relieving blade 56 or 58 is preferably arranged in the cutter head to precede the blade or blades 47 employed to finish cut the working tooth faces.

It is necessary that while the tip relieving blade 56 or 58 is traversing the tooth space the axial motion of the cutter be at a slower rate in relation to its rotation than when the blade 47 is cutting. This will be evident from Fig. 11 which shows that the blade 47 in passing from the section of the tooth space shown by full lines to the section shown by dotted lines, where the tooth space is wider, must move depthwise, i. e. axially of the cutter, a distance 61. To maintain substantially the same width of relief 54 along the tips of the teeth, the chamfering blade 56 need move depthwise only the smaller distance 62. The width of the tip relief along the tooth may be varied by varying the rate of the axial motion of the cutter as the blade 56 or 58 traverses the tooth space.

Due to the nature of curvature of the face cone of the gear and the spiral angle of the teeth, the width of the tip relief will not be exactly constant from end to end when the relieving blade follows a helix of constant lead while cutting. The variation in width will differ with the diameter of the gear (relative to the diameter of the cutter), with the face angle, and also with spiral angle. If satisfactory constancy of width for a particular purpose is not obtained with a constant ratio of cutter rotation to cutter axial motion, this ratio may be varied by employing a helical motion cam having a suitably varying lead. Another way of controlling the width of the tip relief is that shown in Fig. 13 where the side cutting edges of the relieving blade 63 are curved concavely, the curvature being so designed that as the blade cuts, moving along a helix of constant lead, the width of the tip relief will be constant from end to end of the tooth space.

The non-generated gears of the present invention may be produced by means of a machine and cutter of the general kind described in the aforementioned application Serial No. 267,824, while the mating pinions may be made on conventional spiral bevel and hypoid pinion generating machines. In the generation of a pinion, the cutter is so positioned that the surface of revolution described by its cutting edges represents a tooth surface of a tapered generating gear which closely approximates the tooth shape of the non-generated mate gear of the pinion. The axis of the pinion cutter is disposed parallel to the helix axis of the helicoidal tooth surfaces of the mate gear, corresponding to the parallel relation between helix axis 22 and cone axis 28 in Fig. 2.

However the present invention is not restricted to any particular method of manufacture. What is claimed as our invention is:

1. A tapered gear having tooth sides that are helicoidal surfaces, the helix axis of each such helicoidal surface lying in a plane which intersects a plane containing the gear axis in a line that passes through a selected mean point of the tooth space adjacent said surface and is inclined to the plane of rotation of the gear by an angle which is at least substantially as great as the face angle of the gear.

2. A tapered gear according to claim 1 in which the helix axes of the helicoidal surfaces comprising the opposite sides of each tooth space are coincident.

3. A gear according to claim 1 wherein both sides of each tooth space are coaxial helicoidal surfaces of the same lead.

4. A tapered gear having tooth sides that are helicoidal surfaces, said surfaces on opposite sides of each tooth space having a common helix axis, said axis lying in a plane containing a line which passes through the mean point of the tooth space between said surfaces and is substantially normal to the face cone of the gear.

5. A tapered gear having tooth sides that are helicoidal surfaces, said surfaces on opposite sides of each tooth space having a common helix axis, said axis lying in a plane which intersects a plane containing the gear axis in a line that passes through a selected mean point in the tooth space and is inclined to the plane of rotation of the gear by an angle greater than the face angle of the gear.

6. A tapered gear having tooth sides with relieved tips, said sides and tips being helicoidal surfaces, the helix axis of each such side and its tip lying in a plane containing a line which passes through the mean point of the tooth space adjacent said surfaces and is substantially normal to the face cone of the gear, the helical lead of said side being different from that of said tip.

7. A tapered gear having tooth sides with relieved tips, said sides and tips being helicoidal surfaces, the helix axis of each such side and its tip lying in a plane which intersects a plane containing the axis of the gear in a line that passes through the mean point of the tooth space adjacent said surfaces and that is inclined to the plane of rotation of the gear by an angle larger than the face angle of the gear, the helical lead of said side being different from that of said tip.

8. A tapered non-generated curved tooth gear whose teeth are relieved at their tips, the relief on each tooth side being a helicoidal surface whose axis is coincident with the axis of the adjacent side surface of the tooth.

9. A tapered gear pair comprising a generated pinion whose imaginary generating gear is tapered and has conical tooth surfaces, and a non-generated gear having helicoidal tooth surfaces, with the cone axis of each conical surface substantially parallel to the helix axis of the mating helicoidal surface in one position of engagement of the mating surfaces.

10. A tapered gear pair according to claim 9 in which the axis of each helicoidal tooth surface lies in a plane containing a line that passes through the mean point of the tooth space adjacent such helicoidal surface and is substantially normal to the face cone of the gear.

No references cited.